(12) United States Patent
Cresswell

(10) Patent No.: US 6,767,174 B2
(45) Date of Patent: Jul. 27, 2004

(54) PIVOTING UNLOADING AUGER

(75) Inventor: Mark Cresswell, St. Brieux (CA)

(73) Assignee: Bourgault Industries, Inc., St. Brieux (CA)

( * ) Notice: Subject to any disclaimer, the term of this patent is extended or adjusted under 35 U.S.C. 154(b) by 75 days.

(21) Appl. No.: 10/100,538

(22) Filed: Mar. 18, 2002

(65) Prior Publication Data

US 2003/0175102 A1 Sep. 18, 2003

(51) Int. Cl.⁷ .................................................. B60P 1/40
(52) U.S. Cl. ........................ 414/523; 414/526; 198/668
(58) Field of Search ................................. 414/504, 505, 414/523, 526; 198/666, 668, 550.1, 550.6, 587, 313–318

(56) References Cited

U.S. PATENT DOCUMENTS

| | | | | |
|---|---|---|---|---|
| 2,883,076 A | * | 4/1959 | Palmer | 414/526 |
| 3,664,525 A | | 5/1972 | Herbsthofer | 214/17 D |
| 4,093,087 A | | 6/1978 | DeCoene | 214/83.26 |
| 4,662,812 A | | 5/1987 | Busboom et al. | 414/523 |
| 4,923,358 A | * | 5/1990 | Van Mill | 414/519 |
| 5,409,344 A | | 4/1995 | Tharaldson | 414/505 |
| 5,538,388 A | * | 7/1996 | Bergkamp et al. | 414/523 |
| 5,980,189 A | | 11/1999 | Rubner | 414/505 |
| 6,042,326 A | | 3/2000 | Thomas et al. | 414/502 |
| 6,247,886 B1 | | 6/2001 | Signer et al. | 414/523 |
| 6,248,015 B1 | | 6/2001 | Rayfield et al. | 460/131 |

* cited by examiner

Primary Examiner—Dean J. Kramer
(74) Attorney, Agent, or Firm—Frost Brown Todd LLC

(57) ABSTRACT

A self-unloading container apparatus comprises a container mounted on a vehicle. An upright auger tube has its bottom end in the container and top end outside the container. An intermediate auger tube is pivotally attached at one end to the upright auger tube so as to pivot about a pivot axis on a pivot plane and at the other end to a lateral auger tube at a fixed oblique angle. A universal joint connects the intermediate flighting shaft to the upright flighting shaft with the center of the joint on the pivot plane and axis. A constant velocity universal joint connects the intermediate flighting shaft to the lateral flighting shaft with a center thereof located at the intersection of axes of the intermediate and lateral auger tubes. The lateral auger tube pivots from a transport position aligned with the travel direction, to an operating position transverse to the travel direction.

24 Claims, 7 Drawing Sheets

PIVOTING UNLOADING AUGER

This invention is in the field of auger conveyors and in particular such auger conveyors wherein one portion of the conveyor pivots with respect to another portion.

BACKGROUND OF THE INVENTION

There are common applications where an auger conveyor comprises two sections oriented at an angle to each other, and where the flighting shafts of the sections are connected to each other such that they turn together. It may be further required that the first and second sections pivot with respect to each other while the augers rotate. Such applications include combine grain tank filling augers as illustrated in U.S. Pat. No. 6,248,015 B1 to Rayfield et al., and grain cart unloading augers as illustrated in U.S. Pat. No. 6,042,326 to Thomas et al. The application is also typical in combine unloading augers, as illustrated in U.S. Pat. No. 3,664,525 to Herbstofer, U.S. Pat. No. 6,247,886 B1 to Signer et al., U.S. Pat. No. 4,662,812 to Busboom et al., and U.S. Pat. No. 4,093,087 to DeCoene.

The angle between the two auger sections in the device of Rayfield et al. is shallow enough to allow the connection between the flighting shafts of the two sections to be made with a universal joint, however with the sharper angles of Signer et al. and Thomas et al., a gearbox is required. The addition of a gearbox in the middle of the flow of granular material retards the flow of material and reduces the capacity of the auger conveyor. Where a gearbox is used, the angle between the two auger conveyor sections is fixed, thereby limiting the flexibility of the apparatus.

In the apparatuses of Busboom et al. and DeCoene, an intermediate section of auger conveyor is used such that the required angle between the first and second sections is provided by a smaller angle between the first section and the intermediate section, and again between the intermediate section and the second section. A universal joint at each end joins the auger flighting shafts together. Where a single universal joint would not provide satisfactory service when operated at the angle between the first and second sections, that angle can be reduced by half when splitting it between two universal joints.

In the auger apparatus of Busboom et al. a bottom cross auger and the intermediate section are fixed in position, while the straight unloading auger section pivots about an oblique axis so that the auger can move from a transport position up and forward to an operating range of positions. The discharge end of the unloading auger moves quite sharply up and down as it moves forward and rearward.

In the apparatus of DeCoene a bottom cross auger is fixed and the intermediate auger and unloading auger pivot about an axial plane that is in the middle of the intermediate auger. With this pivot plane location, the intermediate auger moves up and down and fore and aft when the unloading auger pivots. The tube on the intermediate section must be much larger than the auger flighting to accommodate this movement, reducing efficiency of the auger. Much grain is wastefully moved sideways as it is not confined by a close tubing wall. As in the apparatus of Busboom et al. the discharge end of the unloading auger moves quite sharply up and down as it moves forward and rearward.

U.S. Pat. No. 5,409,344 to Tharaldson and U.S. Pat. No. 5,980,189 to Rubner disclose self-unloading hoppered grain carts similar to Thomas, but unlike Thomas the cart container is hoppered to a central sump such that a cross-auger at the bottom is not required. Both comprise a first upright conveyor section to carry grain upwards and outwards from the sump to an upper location outside the container where same falls into a second lateral conveyor section that pivots with respect to the cart. Each section is a separate conveyor requiring separate drives, mounts, and the like.

SUMMARY OF THE INVENTION

It is an object of the present invention to provide an improved self-unloading container apparatus mounted on a vehicle and having an auger conveyor with a discharge end that can be pivoted from a transport position to operating positions extending put to one side of the vehicle so as to discharge the contents of the container into a transport vehicle.

It is a further object of the present invention to provide such an apparatus wherein the discharge maintains a more consistent vertical position while moving forward and backward in the operating range. It is a further object of the present invention to provide such an apparatus wherein obstruction of the auger tube is reduced, and capacity is thereby increased.

It is a further object of the present invention to provide such an apparatus wherein the container includes a floor sloped down to a sump located in a central portion of the container, and comprising an integrated auger apparatus to carry material from the sump to a discharge that can be moved to a range of operating positions extending laterally from the container.

The present invention provides, in one aspect, a self-unloading container apparatus mounted on a vehicle for travel in an operating travel direction. The apparatus comprises a container mounted on the vehicle and a fixed upright auger tube mounted in the container and oriented such that a lower intake end thereof is located in the bottom of the container. The upright auger tube slopes upward and outward, transverse to the operating travel direction, to an upper output end thereof located outside the container adjacent to an upper side wall of the container, and an upright flighting shaft is positioned inside the upright auger tube. An intermediate auger tube is pivotally attached at an input end thereof to a top output end of the upright auger tube so as to pivot about a pivot axis on a pivot plane, and an intermediate flighting shaft is positioned inside the intermediate auger tube. A lateral auger tube is attached at an input end thereof to an output end of the intermediate auger tube at a fixed oblique angle, and a lateral flighting shaft is positioned inside the lateral auger tube. A universal joint connects an input end of the intermediate flighting shaft to the upright flighting shaft such that a center of the universal joint is located substantially on the pivot plane and pivot axis, and a constant velocity universal joint connects an output end of the intermediate flighting shaft to the lateral flighting shaft such that a center of the constant velocity universal joint is located substantially at the intersection of axes of the intermediate and lateral auger tubes. A control is operative to pivot the intermediate auger tube with respect to the upright auger tube from a transport position, wherein the lateral auger tube is substantially aligned with the operating travel direction, to an operating position, wherein the lateral auger tube extends outward from the container transverse to the operating travel direction. A drive is operative to rotate the flighting shafts.

The apparatus of the invention is particularly suited to a hopper bottom grain cart. The intake end is located in a central sump and an upright section slopes outward to a position outside the container, as is generally required in these hoppered containers, and the slope also reduces the angle required between the upright and lateral sections to bring the lateral section to a shallow angle with respect to the horizontal.

In a second aspect the invention provides a self-unloading hopper bottom grain cart comprising a container having a hopper floor sloping down to a centrally located sump. A fixed upright auger tube is mounted such that a lower intake end thereof is substantially in the sump and the upright auger tube slopes upward and outward, transverse to the operating travel direction, to an upper output end thereof located outside the container adjacent to an upper side wall of the container, and an upright flighting shaft is inside the upright auger tube. An intermediate auger tube is pivotally attached at an input end thereof to a top output end of the upright auger tube so as to pivot about a pivot axis on a pivot plane, and an intermediate flighting shaft is inside the intermediate auger tube. A lateral auger tube is attached at an input end thereof to an output end of the intermediate auger tube at a fixed oblique angle, and a lateral flighting shaft is inside the lateral auger tube. A universal joint connects an input end of the intermediate flighting shaft to the upright flighting shaft such that a center of the universal joint is located substantially on the pivot plane and pivot axis. A constant velocity universal joint connects an output end of the intermediate flighting shaft to the lateral flighting shaft such that a center of the constant velocity universal joint is located substantially at the intersection of axes of the intermediate and lateral auger tubes. A control is operative to pivot the intermediate auger tube with respect to the upright auger tube from a transport position, wherein the lateral auger tube is substantially aligned with an operating travel direction, to an operating position, wherein the lateral auger tube extends outward from the container transverse to the operating travel direction. A drive train is adapted for connection to a towing vehicle and is operative to rotate the flighting shafts.

The pivot axis can be oriented such that the first and intermediate flighting shafts are aligned, reducing stress on the universal joint connecting the two. The constant velocity universal joint allows a sharper angle between the intermediate and lateral tubes such that the lateral tube can be oriented near the horizontal for maximum reach. Where desired, the pivot axis can also be oriented such that the discharge end of the auger conveyor moves up and down as well as laterally with respect to the intake end of the conveyor. By re-orienting the pivot axis, a wide range of movement can be achieved at the discharge end of the lateral tube.

The constant velocity universal joint, combined with the small operating angles that are achieved on the standard universal joint, provide a very smooth operating auger conveyor throughout a significant operating range of movement of the discharge end of the lateral tube. A wider operating range and steeper angles between the upright and lateral tube can be achieved by using a constant velocity universal joint at each end of the intermediate flighting shaft. The apparatus is simple and economical to manufacture and maintain.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
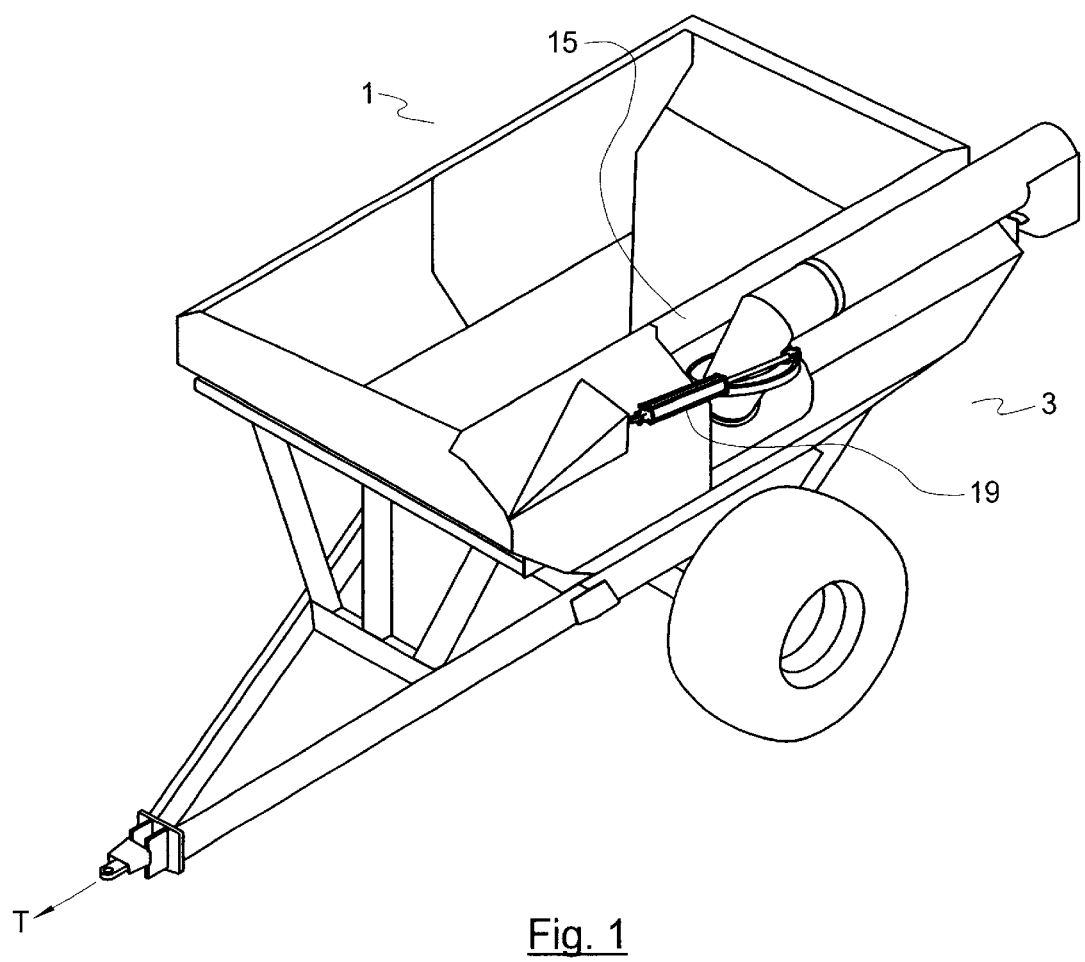
FIG. 1 is a perspective view of a self-unloading hoppered container of the invention mounted on a grain cart.

FIGS. 1–7 illustrate a self-unloading container apparatus 1 mounted on a vehicle for travel in an operating travel direction T. The vehicle is illustrated as a hopper bottom grain cart 3, with a container having a floor 7 sloping down to a sump 9 located in a bottom central portion of the container 5. A fixed upright auger tube 10 is mounted in the hoppered container 5 and oriented such that a lower intake end 10A thereof is located in the sump 9 and the upright auger tube 10 slopes upward and outward to an upper output end 10B thereof located outside the container 5 adjacent to an upper side wall 15 of the container 5.

An intermediate auger tube 11 is pivotally attached at an input end 11A thereof to the output end 10B of the upright auger tube 10 so as to pivot about a pivot axis PA. The pivot plane PP is defined by pivot plates 16 mounted on the input end 11A of the intermediate auger tube 11 and the output end 10B of the upright auger tube 10, and maintained in position conventionally while pivoting. The intermediate auger tube 11 is attached at an output end 11B thereof to the input end 12A of the lateral auger tube 12 at a fixed oblique angle N3.

A control, illustrated as hydraulic cylinder 19, is operative to pivot the intermediate auger tube 11, and the lateral auger tube 12 fixed thereto, with respect to the upright auger tube 10 from a transport position TP, wherein the lateral auger tube 12 is oriented substantially aligned with the operating travel direction T, to an operating position OP, wherein the lateral auger tube 12 extends outward from the hoppered container 5 transverse to the operating travel direction T.

As illustrated in FIGS. 8–11, the intermediate auger tube 11 includes an intermediate flighting shaft 21 connected at an input end 21A thereof to an upright flighting shaft 20 in the upright auger tube 10 by a standard universal joint 25, and connected at an output end 21B thereof to a lateral flighting shaft 22 in the lateral auger tube 12 by a constant velocity universal joint 26.

The standard universal joint 25 is located such that its center 25C is located on the pivot plane PP and pivot axis PA. The constant velocity universal joint 26 is located such that its center 26C is located substantially at the intersection of axes IA and LA of the intermediate and lateral auger tubes 11, 12. This positioning provides minimum movement of one flighting shaft relative to any other flighting shaft during pivoting. The constant velocity universal joint 26 can also float on the lateral flighting shaft 22 to allow a small longitudinal movement back and forth during pivoting.

Steady bearings 28 are operative to steady the output end 20B of the upright flighting shaft 20 and the input end 22A of the lateral fighting shaft 22.

The illustrated angle N3 between the axes IA, LA of the intermediate auger tube 11 and lateral auger tube 12 is 40°. This angle remains constant throughout the travel of the lateral auger tube 12, and the angle between the intermediate and lateral flighting shafts 21, 22 remains substantially constant as well. This relatively large angle is made possible by using the constant velocity universal joint 26 rather than a standard universal joint. At the opposite end of the intermediate flighting shaft 21, the standard universal joint 25 operates at an angle that varies from zero at the aligned operating position OPA to increasing angles on each side of that position between OP' and OP" that are within the desired operating range for such joints.

A conventional drive, not illustrated, is connected to the bottom of the upright flighting shaft 20 and is operative to rotate the upright flighting shaft 20 and through the universal joints 25, 26 to rotate the intermediate and lateral flighting shafts 21, and 22.

Figure 6:
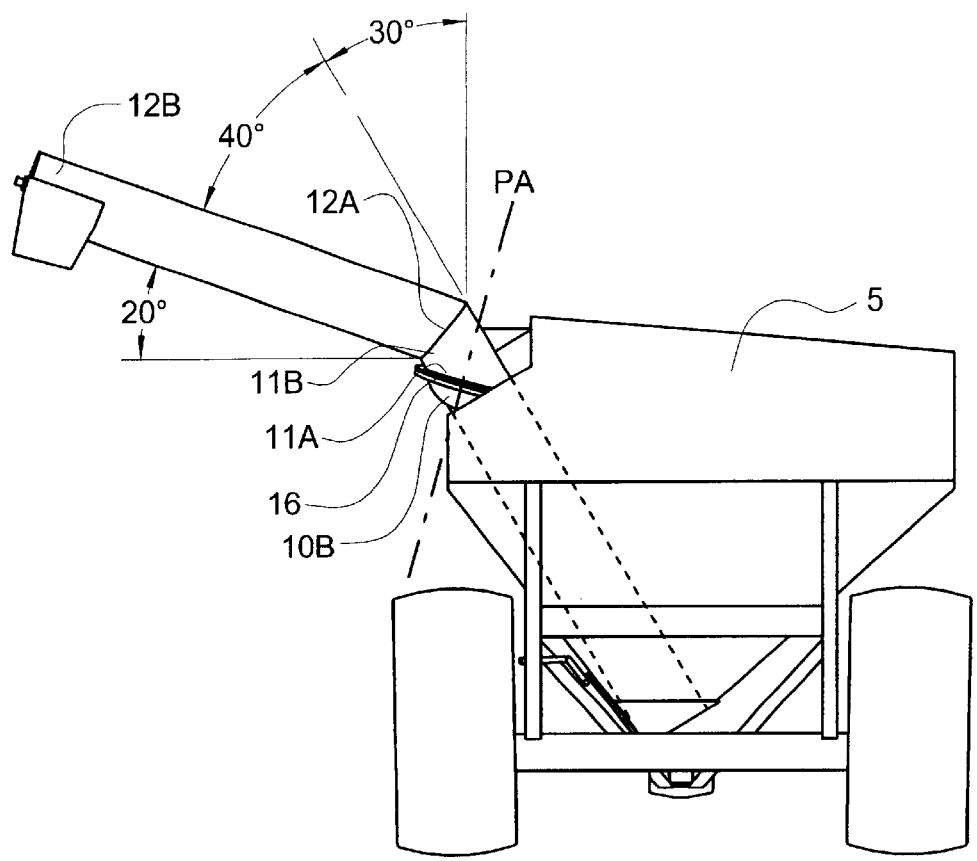
FIG. 6 is a rear view of the embodiment of FIG. 1 with the lateral section of the auger conveyor in the aligned operating position.

Thus, as illustrated in FIG. 6, the upright auger tube 10 slopes outward and down from the vertical at 30°, and in the aligned operating position illustrated, is aligned with the intermediate auger tube 11. The lateral auger tube 12 is angled down 40° with respect to the intermediate auger tube 11 with the result that that the lateral auger tube 12 is oriented at 70° down from the vertical, or 20° above horizontal. The pivot axis PA is also oriented such that in the transport position TP, best seen in FIG. 3, the lateral auger tube 12 is horizontal.

Figure 2:
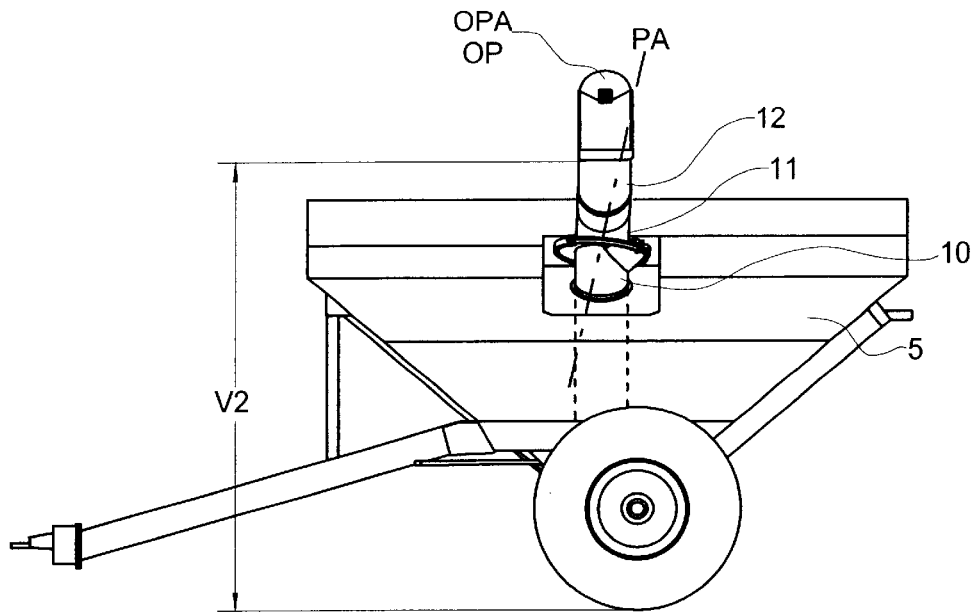
FIG. 2 is a side view of the embodiment of FIG. 1 with the lateral section of the auger conveyor in the aligned operating position.
Figure 12:
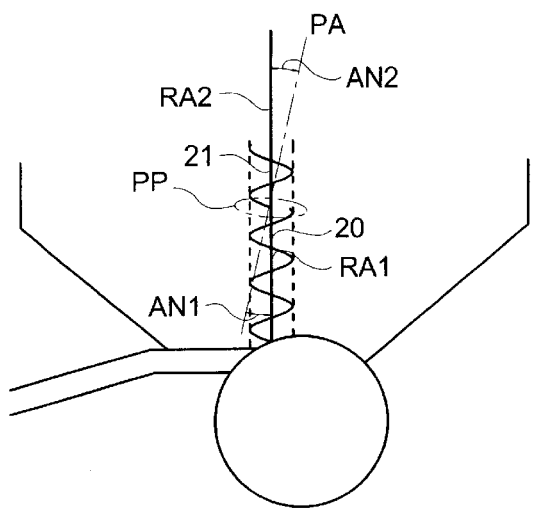
FIG. 12 is a schematic side view showing the orientation of the rotational axes of the upright and intermediate flighting shafts and the pivot axis with the lateral section of the auger conveyor in the aligned operating position.

FIG. 12 is a schematic side view of the connection between the upright and intermediate flighting shafts 20, 21 in the aligned operating position of FIG. 2. The pivot axis PA is oriented at an oblique angle AN1 in the fore and aft dimension with respect to the rotational axis RA1 of the upright flighting shaft 20. The pivot axis PA is also oriented at an oblique angle AN2 with respect to a rotational axis RA2 of the intermediate flighting shaft 21. At this location on the pivot arc, the angles AN1 and AN2 are equal, so that the rotational axes RA1 and RA2 are in alignment.

Figure 3:
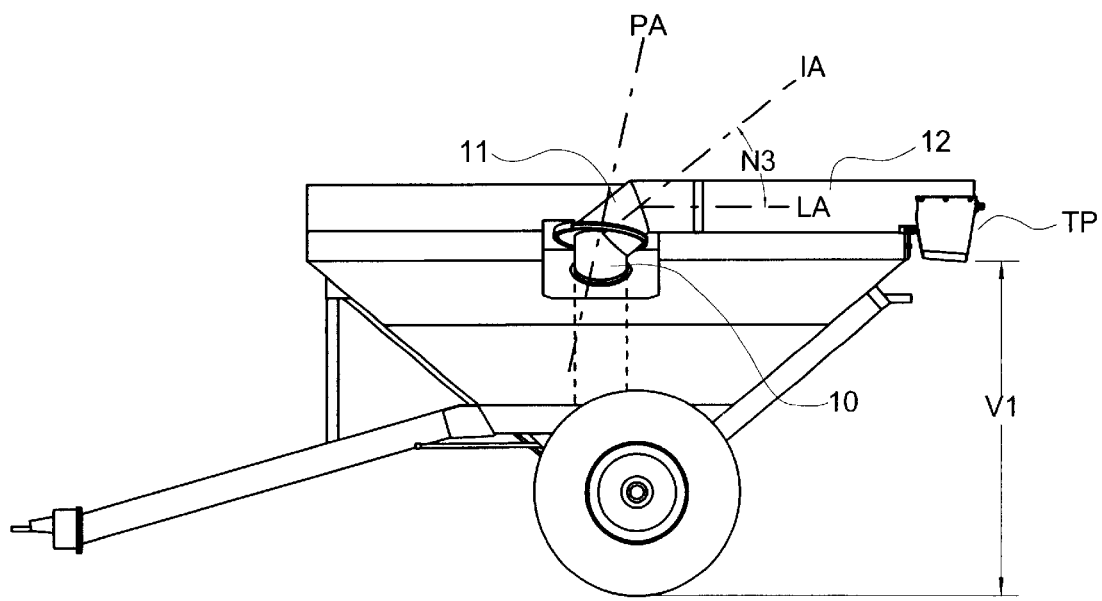
FIG. 3 is a side view of the embodiment of FIG. 1 with the lateral section of the auger conveyor in the transport position.
Figure 14:
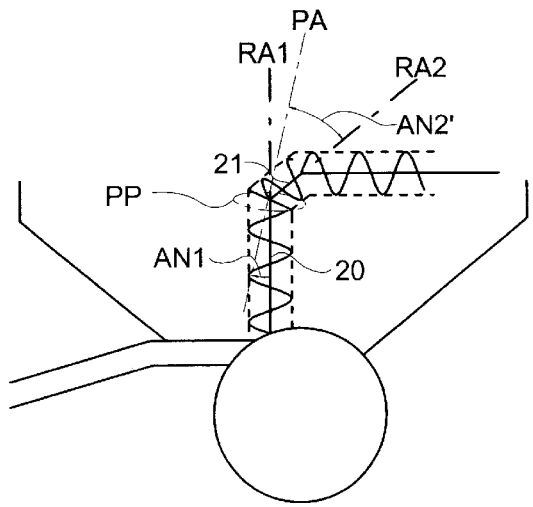
FIG. 14 is a schematic side view showing the orientation of the rotational axes of the upright and intermediate flighting shafts and the pivot axis with the lateral section of the auger conveyor in the transport position.

FIG. 14 is a schematic side view of the connection between the upright and intermediate flighting shafts 20, 21 in the transport position TP of FIG. 3. As the intermediate auger tube 11 pivots with respect to the upright auger tube 10, the angle AN1 remains substantially constant, but the angle AN2 moves to the new angle AN2'.

Figure 13:
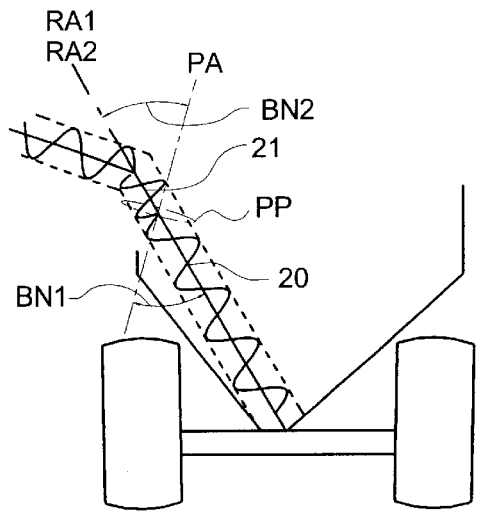
FIG. 13 is a schematic rear view showing the orientation of the rotational axes of the upright and intermediate flighting shafts and the pivot axis with the lateral section of the auger conveyor in the aligned operating position.

FIG. 13 schematically shows the connection between the upright and intermediate flighting shafts 20, 21 in the same aligned operating position of FIG. 12, but from the rear, a view similar to that of FIG. 6. The pivot axis PA is oriented at an oblique angle BN1 in the left and right dimension with respect to the rotational axis RA1 of the upright flighting shaft 20 and at an oblique angle BN2 in the left and right dimension with respect to a rotational axis RA2 of the intermediate flighting shaft 21. Again at this location on the pivot arc, seen from the rear, the angles BN1 and BN2 are equal, so that the rotational axes RA1 and RA2 are in alignment.

Figure 4:
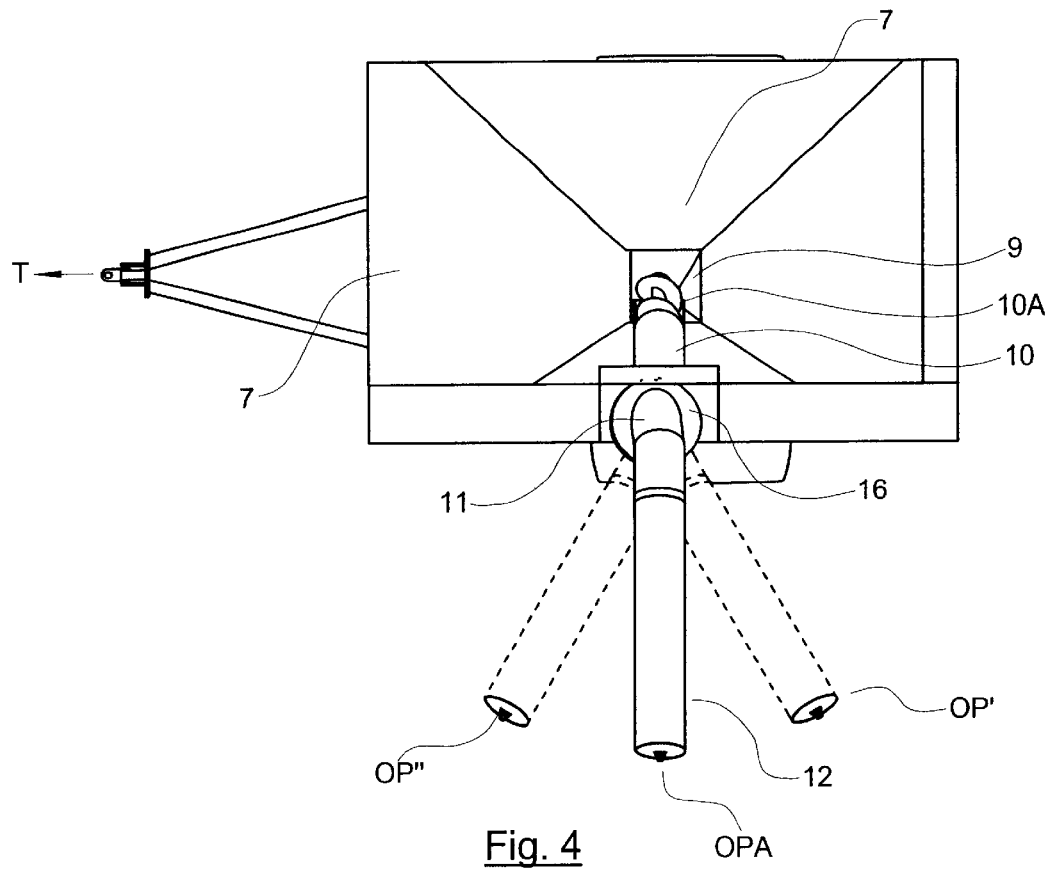
FIG. 4 is a top view of the embodiment of FIG. 1 with the lateral section of the auger conveyor in the aligned operating position.
Figure 5:
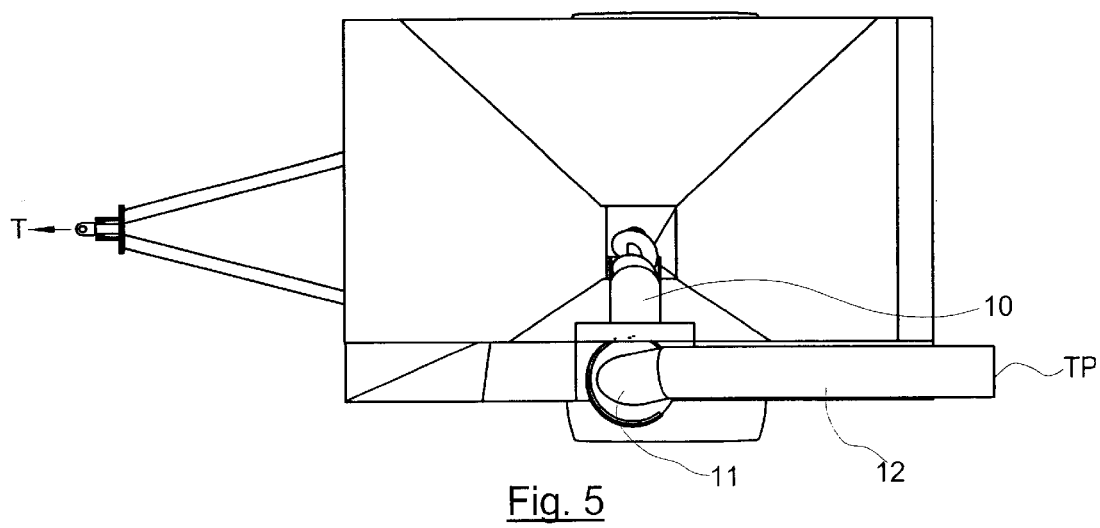
FIG. 5 is a top view of the embodiment of FIG. 1 with the lateral section of the auger conveyor in the transport position.

Thus in the aligned operating position of FIGS. 2, 4, and 6 the upright flighting shaft 20 and intermediate flighting shaft 21 are aligned so that the standard universal joint 25 is straight. It is known that the less the angle on a universal joint, the smoother the rotation with reduced speed variance and reduced stress and wear on the joint. FIG. 4 shows a preferred operating range from position OP' to OP", approximately 25–30 degrees rearward and forward from the aligned operating position OPA where the angle on the standard universal joint 25 is quite shallow. In the illustrated embodiment the auger flighting can rotate in the transport position as well as in operating positions between transport and the forward position OP", however in the positions closer to transport the standard universal joint 25 experiences considerable wear due to the sharp angle between the rotational axes RA1, RA2 of the upright and intermediate flighting shafts 20, 21.

For some applications, such as where a sharper angle is desired between the upright auger tube 10 and the lateral auger tube 12, it might be desired to have the standard universal joint 25 operate at an angle greater than zero when in the aligned operating position OP. Where the desired angle increases, or where an extended operating range is desired, a second constant velocity universal joint could be substituted for the standard universal joint 25.

Figure 7:
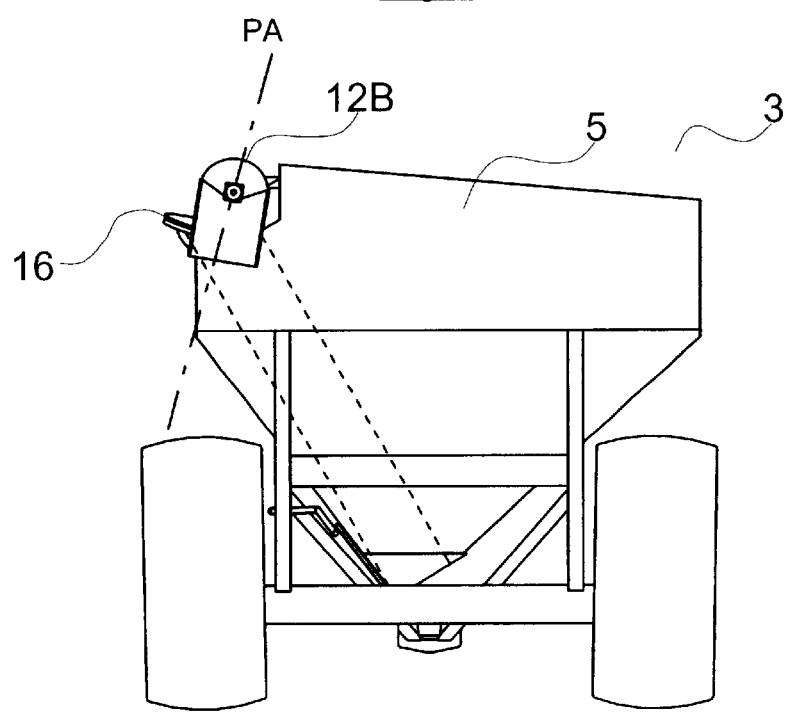
FIG. 7 is a rear view of the embodiment of FIG. 1 with the lateral section of the auger conveyor in the transport position.
Figure 15:
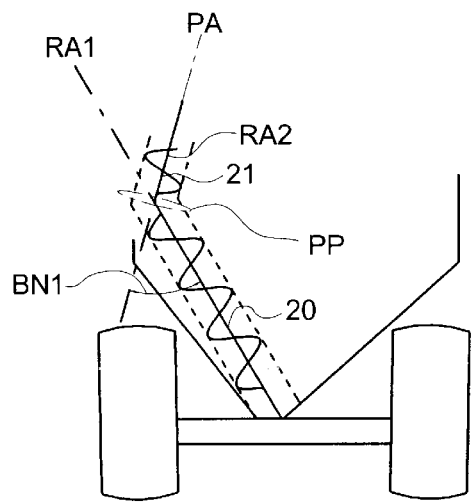
FIG. 15 is a schematic rear view showing the orientation of the rotational axes of the upright and intermediate flighting shafts and the pivot axis with the lateral section of the auger conveyor in the transport position.

FIG. 15 schematically shows the connection between the upright and intermediate flighting shafts 20, 21 in the same transport position TP as FIG. 14, but from the rear, a view similar to that of FIG. 7. Again as the intermediate auger tube 11 pivots with respect to the upright auger tube 10, the angle BN1 remains substantially constant, but the angle BN2 changes. Coincidentally, because of the particular design of the illustrated embodiment, in the view of FIG. 15 the rotational axis RA2 of the intermediate flighting shaft 21 substantially aligns with the pivot axis PA when seen from the rear, and the angle BN2 becomes zero. Slight changes in orientation would move this angle BN2 to some other angle.

As best seen in FIG. 4, the lateral auger tube 12 is substantially perpendicular to the operating travel direction T when in the aligned operating position OPA. In this position the output end 12B of the lateral auger tube 12 is at the maximum distance from the cart 3 providing the maximum reach for the auger conveyor. The preferred operating range from OP' to OP" is indicated as well, allowing the operator to move the output end 12B back and forth to fill an elongate transport vehicle such as a semi-trailer.

As best seen in FIGS. 2 and 3, the output end 12B of the lateral auger tube 12 moves upward from height V1 when the lateral auger tube 12 moves from the transport position TP to height V2 when in the aligned operating position OPA. The pivot axis PA is tilted inward and back to cause this movement. The lateral auger tube is lower, adding stability to the cart 3 when in the transport position TP, and moves higher to provide increased clearance in the operating positions. The orientation of the pivot axis PA can be varied to achieve the desired movement of the lateral auger tube 12 for different applications.

The pivot plane PP is represented by the pivot plates 16 and may be more easily visualized than the pivot axis PA which is simply an imaginary line perpendicular to the pivot plane PP. The pivot plane PP is inclined such that an upper surface thereof faces toward the center of the container 5 and rearward, as can be seen in FIGS. 3 and 7. This orientation of the pivot plane PP dictates the path of the lateral auger tube 12, and can be changed to suit the particular application. For instance if the pivot plane PP was oriented horizontally, the discharge end of the lateral auger tube 12 would also move horizontally. Similarly if the pivot axis PP was inclined so that the upper surface thereof faced away from the center, or forward, the discharge end of the lateral tube 12 would move down when pivoting from the transport position TP to toward an operating position OP. Appropriate adjustments to the orientation of the apparatus as a whole must be made as well, but it can be seen that the apparatus provides considerable flexibility in orienting the different sections of the auger conveyor with respect to the cart 3 and with respect to each other.

Figure 8:
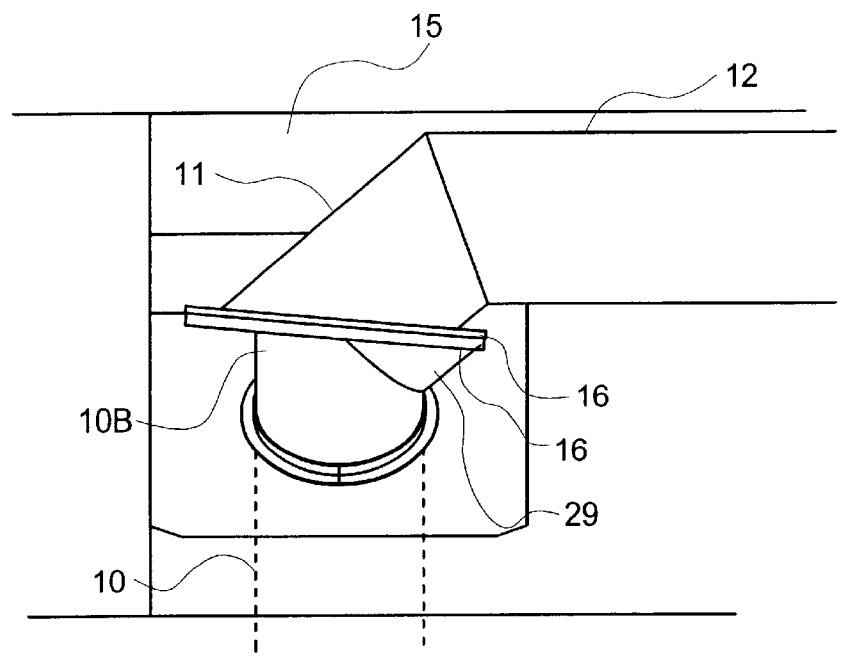
FIG. 8 is a side view of the connection of the upright and lateral auger conveyor sections using an intermediate section, with the lateral section of the auger conveyor in the transport position.
Figure 9:
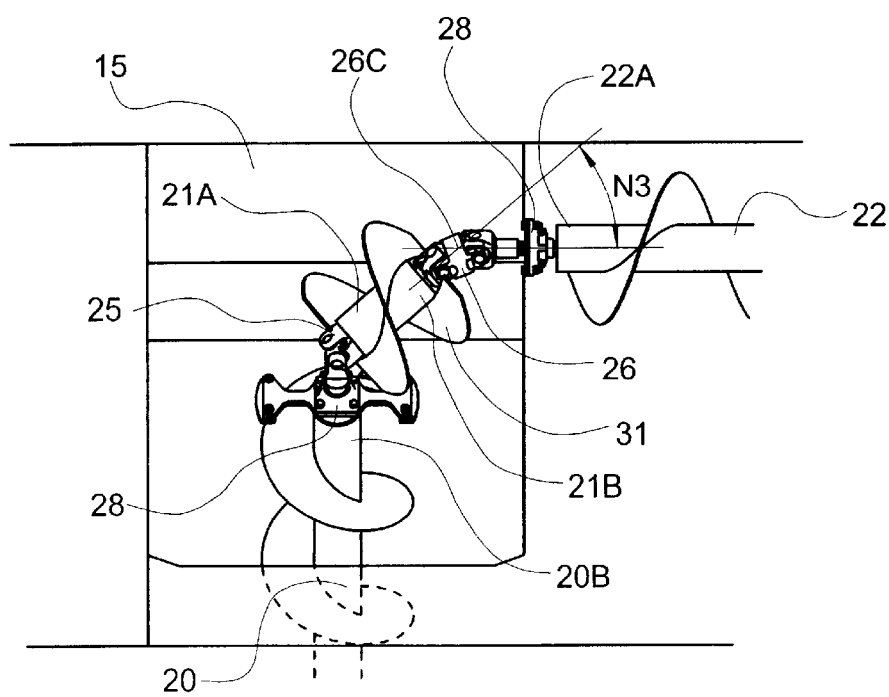
FIG. 9 is the side view of FIG. 8 with the auger tubes removed.
Figure 10:
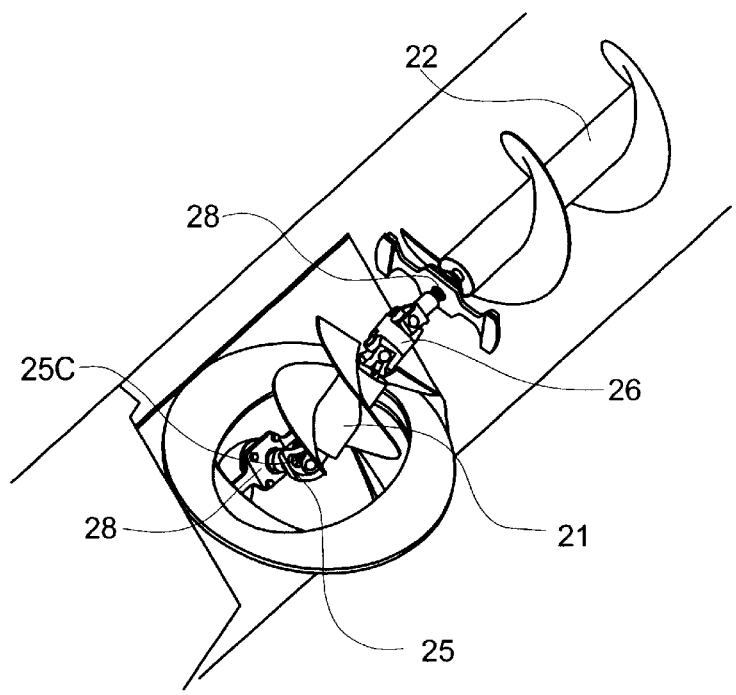
FIG. 10 is a perspective view of the connection of FIGS. 8 and 9 with the lateral section of the auger conveyor in the transport position.
Figure 11:
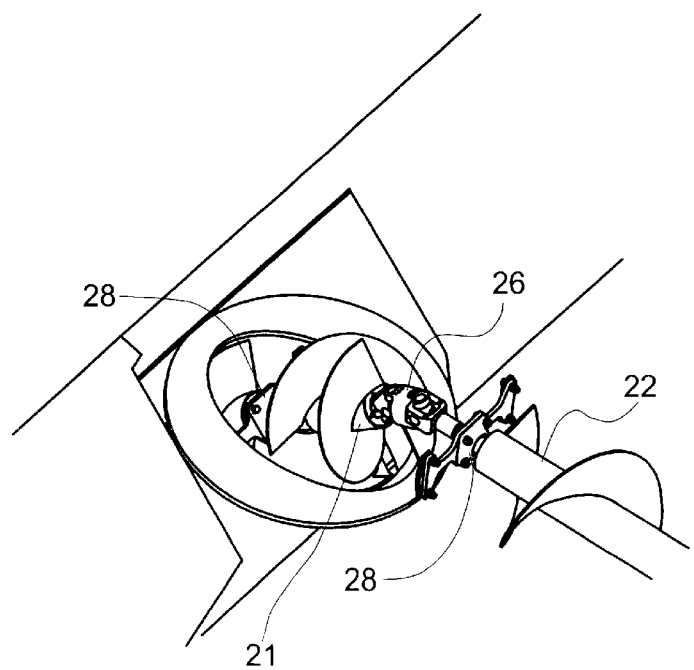
FIG. 11 is a perspective view of the connection of FIG. 10 with the lateral section of the auger conveyor in the aligned operating position.

As best seen in FIG. 8, the upper output end 10B of the upright auger tube 10 includes a trough 29 oriented to accommodate intermediate flighting 31 of the intermediate auger tube 11 when the intermediate auger tube 11 is pivoted from the operating position OP' towards the transport position TP. When the upright and intermediate auger tubes 10, 11 are aligned or close to alignment, as in the range OP' to OP", the intermediate flighting 31 will not contact the output end 10B of the upright auger tube 10. As seen in FIG. 8 when the lateral auger tube pivots to a position nearer the transport position TP the trough 29 is required to prevent the intermediate flighting from contacting the tube 10. Alternatively the diameter of the intermediate flighting 31 may be reduced to prevent this contact, or the diameter of the intermediate auger tube 11 increased, or either could be somewhat tapered. These variations will however somewhat reduce the capacity of the auger conveyor.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A self-unloading container apparatus mounted on a vehicle for travel in an operating travel direction, the apparatus comprising:

a container mounted on the vehicle;

a fixed upright auger tube mounted in the container and oriented such that a lower intake end thereof is located in proximity to a bottom of the container and the upright auger tube slopes upward and outward, transverse to the operating travel direction, to an upper output end thereof located outside the container adjacent to an upper side wall of the container, and an upright flighting shaft inside the upright auger tube, an intermediate auger tube pivotally attached at an input end thereof to a top output end of the upright auger tube so as to pivot about a pivot axis on a pivot plane, and an intermediate flighting shaft inside the intermediate auger tube;

a lateral auger tube attached at an input end thereof to an output end of the intermediate auger tube at a fixed oblique angle, and a lateral flighting shaft inside the lateral auger tube;

a universal joint connecting an input end of the intermediate flighting shaft to the upright flighting shaft such that a center of the universal joint is located substantially on the pivot plane and pivot axis;

a constant velocity universal joint connecting an output end of the intermediate flighting shaft to the lateral flighting shaft such that a center of the constant velocity universal joint is located substantially at the intersection of axes of the intermediate and lateral auger tubes;

a control operative to pivot the intermediate auger tube with respect to the upright auger tube from a transport position, wherein the lateral auger tube is substantially aligned with the operating travel direction, to an operating position, wherein the lateral auger tube extends outward from the container transverse to the operating travel direction; and a drive operative to rotate the flighting shafts.

2. The apparatus of claim 1 wherein the pivot axis is oriented at an oblique angle with respect to a rotational axis of the upright flighting shaft and the pivot axis is oriented at an oblique angle with respect to a rotational axis of the intermediate flighting shaft.

3. The apparatus of claim 2 wherein the pivot axis is oriented at an oblique angle in left and right as well as fore and aft dimensions with respect to the rotational axis of the upright flighting shaft and with respect to the rotational axis of the intermediate flighting shaft.

4. The apparatus of claim 1 wherein the pivot plane is inclined such that an upper surface thereof faces toward a center of the container.

5. The apparatus of claim 4 wherein the pivot plane is inclined such that the upper surface thereof faces rearward.

6. The apparatus of claim 1 wherein the intermediate auger tube can be pivoted into an aligned operating position wherein the intermediate flighting shaft is in substantial alignment with the upright flighting shaft.

7. The apparatus of claim 6 wherein the lateral auger tube is substantially perpendicular to the operating travel direction when in the aligned operating position.

8. The apparatus of claim 7 wherein an output end of the lateral auger tube moves upward when the lateral auger tube moves from the transport position to the aligned operating position.

9. The apparatus of claim 6 wherein the control is operative to pivot the lateral auger tube from the transport position at least 25 degrees beyond the aligned operating position.

10. The apparatus of claim 1 wherein the container has a hopper floor sloping down to a centrally located sump, and where the intake end of the upright auger tube is located substantially in the sump.

11. The apparatus of claim 1 wherein the upper output end of the upright auger tube includes a trough oriented to accommodate flighting of the intermediate flighting shaft when the intermediate auger tube is pivoted from the operating position to the transport position.

12. The apparatus of claim 1 further comprising a first steady bearing operative to steady an output end of the upright flighting shaft and a second steady bearing operative to steady the input end of the lateral flighting shaft.

13. The apparatus of claim 1 wherein the universal joint connecting the upright and intermediate flighting shafts is a constant velocity universal joint.

14. A self-unloading hopper bottom grain cart comprising:
   a container having a hopper floor sloping down to a centrally located sump;
   a fixed upright auger tube mounted such that a lower intake end thereof is substantially in the sump and the upright auger tube slopes upward and outward, transverse to the operating travel direction, to an upper output end thereof located outside the container adjacent to an upper side wall of the container, and an upright flighting shaft inside the upright auger tube,
   an intermediate auger tube pivotally attached at an input end thereof to a top output end of the upright auger tube so as to pivot about a pivot axis on a pivot plane, and an intermediate flighting shaft inside the intermediate auger tube;
   a lateral auger tube attached at an input end thereof to an output end of the intermediate auger tube at a fixed oblique angle, and a lateral flighting shaft inside the lateral auger tube;
   a universal joint connecting an input end of the intermediate flighting shaft to the upright flighting shaft such that a center of the universal joint is located substantially on the pivot plane and pivot axis;
   a constant velocity universal joint connecting an output end of the intermediate flighting shaft to the lateral flighting shaft such that a center of the constant velocity universal joint is located substantially at the intersection of axes of the intermediate and lateral auger tubes;
   a control operative to pivot the intermediate auger tube with respect to the upright auger tube from a transport position, wherein the lateral auger tube is substantially aligned with an operating travel direction, to an operating position, wherein the lateral auger tube extends outward from the container transverse to the operating travel direction; and
   a drive train adapted for connection to a towing vehicle and operative to rotate the flighting shafts.

15. The cart of claim 14 wherein the pivot plane is oriented at an oblique angle with respect to a rotational axis of the upright flighting shaft and the pivot plane is oriented at an oblique angle with respect to a rotational axis of the intermediate flighting shaft.

16. The cart of claim 15 wherein the pivot plane is oriented at an oblique angle in left and right as well as fore and aft dimensions with respect to the rotational axis of the upright flighting shaft and with respect to the rotational axis of the intermediate flighting shaft.

17. The apparatus of claim 14 wherein the pivot plane is inclined such that an upper surface thereof faces toward a center of the container.

18. The apparatus of claim 17 wherein the pivot plane is inclined such that the upper surface thereof faces rearward.

19. The apparatus of claim 14 wherein the intermediate auger tube can be pivoted into an aligned operating position wherein the intermediate flighting shaft is in substantial alignment with the upright flighting shaft and the lateral auger tube is substantially perpendicular to the operating travel direction.

20. The cart of claim 19 wherein an output end of the lateral auger tube moves upward when the lateral auger tube moves from the transport position to the aligned operating position.

21. The apparatus of claim 19 wherein the control is operative to pivot the lateral auger tube from the transport position at least 25 degrees beyond the aligned operating position.

22. The apparatus of claim 14 wherein the upper output end of the upright auger tube includes a trough oriented to accommodate flighting of the intermediate flighting shaft when the intermediate auger tube is pivoted from the operating position to the transport position.

23. The apparatus of claim 14 further comprising a first steady bearing operative to steady an output end of the upright flighting shaft and a second steady bearing operative to steady the input end of the lateral flighting shaft.

24. The apparatus of claim 14 wherein the universal joint connecting the upright and intermediate flighting shafts is a constant velocity universal joint.

* * * * *